April 2, 1946.  A. C. HOUGLAND ET AL  2,397,488
CHURN
Filed Dec. 2, 1942
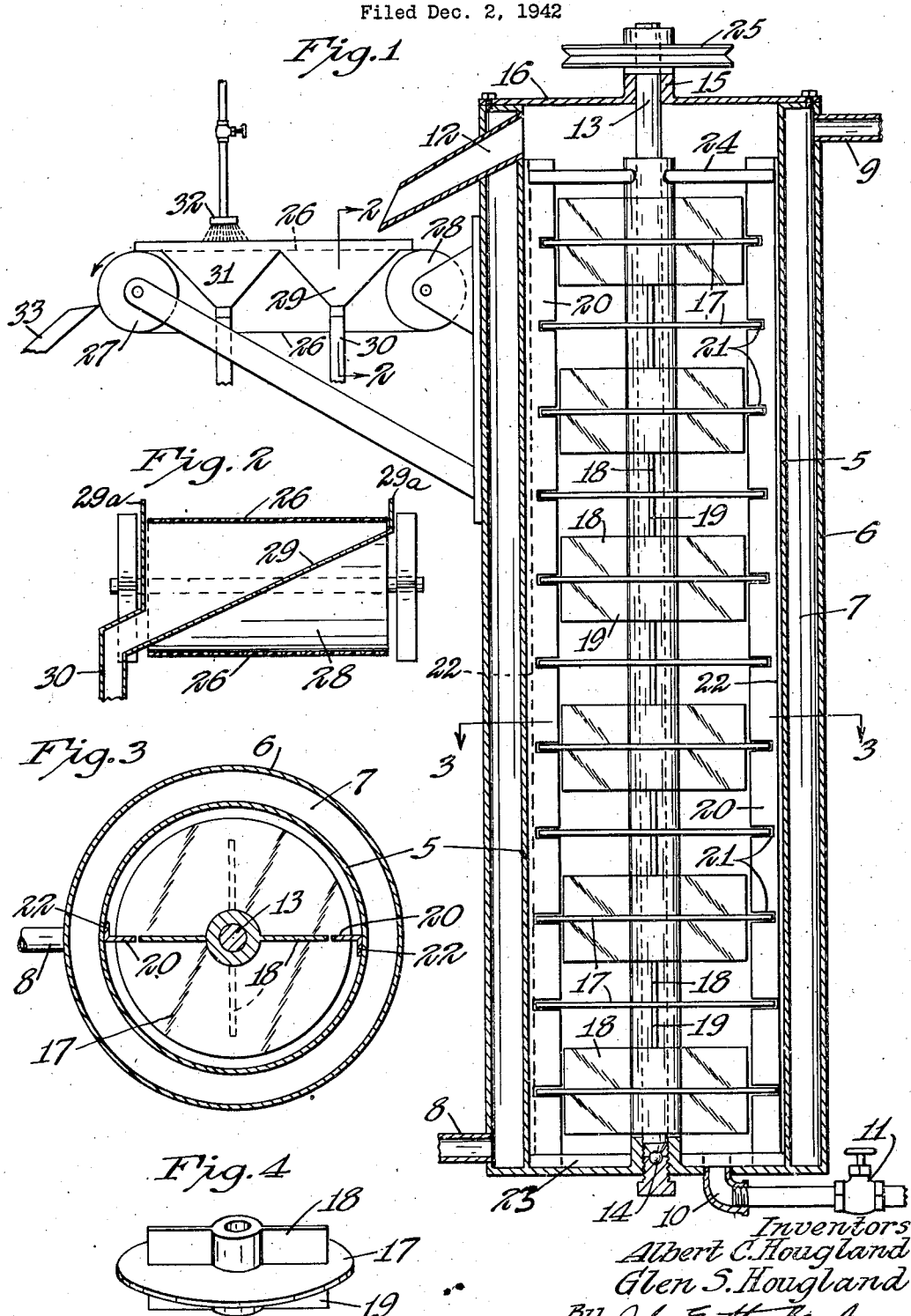
Inventors
Albert C. Hougland
Glen S. Hougland
By John E. Stryker Jr.
Attorney Patented Apr. 2, 1946

2,397,488

UNITED STATES PATENT OFFICE 2,397,488

CHURN

Albert C. Hougland and Glen S. Hougland,
New York, N. Y.

Application December 2, 1942, Serial No. 467,610

6 Claims. (Cl. 259—8)

This invention relates to churns of the type adapted to be operated continuously to receive cream at one end and to discharge the butter and buttermilk at the other end.

The principal objects of our invention are to provide a novel churn having the advantages of large capacity and low cost of operation resulting from continuous operation and improved durability and sanitation resulting from all metal construction such that all interior surfaces are readily accessible for scrubbing and sterilizing treatment.

Other objects will appear and be more fully pointed out in the following specification and claims having reference to the accompanying drawing in which:

Figure 1 is a central vertical section through our improved churn and illustrating diagrammatically suitable mechanism for separating the butter product from the buttermilk and for washing the butter as a continuous operation;

Fig. 2 is a cross section through the separating mechanism taken on the line 2—2 of Fig. 1;

Fig. 3 is a horizontal section through the churn taken on the line 3—3 of Fig. 1, and Fig. 4 is a perspective view of one of the agitating elements of the churn.

As illustrated, our churn has a cylindrical casing 5 disposed with its axis vertical and provided with an outer casing 6 which is spaced from the casing 5 to provide a jacket space 7 through which water or other fluid for controlling the temperature of the churn may be circulated. Connections for the temperature control fluid comprise an inlet pipe 8 communicating with the lower portion of the jacket space and an outlet pipe 9 communicating with its upper portion. Cream may be fed to the churn through an inlet pipe 10 which communicates with the bottom of the churn under control of a valve 11. From the upper portion of the casing 5 the butter and buttermilk are discharged through an outlet conduit 12.

Extending axially from the top to the bottom of the casing 5 is a power-driven shaft 13 which has an end thrust bearing 14 at the bottom of the churn and a bearing 15 formed in a removable cover plate 16. Fixed on the shaft 13 within the casing 5 is a series of agitating units each having a disk 17 extending horizontally and pairs of substantially vertically disposed blades 18 and 19. Each pair of blades 18 projects upward from a disk 17 and the blades 19 project downward therefrom. The outer peripheries of the disks 17 severally project radially outward from the outer ends of the blades 18 and 19 which are disposed vertically and in parallel relation to the inner edges of a pair of baffles 20. These baffles extend radially inward from opposite sides of the casing 5 and have notches 21 to receive the peripheries of the disks 17.

It will be evident that the disks 17 constitute partitions dividing the churn into a series of compartments having communication one with another only through the small annular space between the outer peripheries of the disks 17 and wall of the casing 5. The diameters of the disks 17 are preferably somewhat reduced toward the upper end of the casing so that the spacing of these peripheries relative to the cylindrical wall of the casing increases progressively upward to facilitate the upward passage of the globules of butter fat. As shown in Figs. 1 and 2, the horizontal area of the passage between any two compartments does not exceed a minor fraction of the area of a face of the disk 17 constituting the partition between adjoining compartments. Each of the agitator units has its blades 18 and 19 disposed at right angles to those of the adjoining units, as shown in Fig. 1.

To facilitate cleaning the interior churn surfaces, we make the baffles 20 readily removable. These members are preferably formed with flanges 22 (Fig. 3) which fit snugly against the inner casing surface. To connect and properly locate the members 20 in the casing, their lower ends are connected by a spider 23 and their upper ends by a spider 24. These spiders are removable with the shaft 13 and agitator units from the top of the casing after removal of the cover plate 16. Power for rotating the agitator units may be transmitted through a pulley 25 which is fixed on the upper end portion of the shaft 13.

From the conduit 12 the butter and buttermilk may be delivered to a conveyor belt 26 which is trained on drums 27 and 28. The belt comprises a flexible, stainless steel band having a multiplicity of perforations formed therein and of such size as to permit the passage of the buttermilk through the openings while retaining the globules of butter fat on the conveyor. Extending beneath the upper reach of the belt 26 is a pan 29 to collect the buttermilk and having an outlet conduit 30. As indicated in Fig. 2, the pan 29 has sides 29a projecting along the edges of the belt 26 to retain the butter thereon. A second pan 31, similar to the pan 29, is mounted beneath the belt 26 to collect wash water which is sprayed on the product from a sprayer 32 mounted above the belt and beyond the pan 29.

The washed butter fat may be removed from the conveyor belt 26 as it passes around the drum 27 by a scraping device 33.

Cream is forced into the bottom of the churn at a controlled rate through the pipe 10 and is fed continuously thereby while the shaft 13, carrying the agitating units, is continuously rotated at a fairly high speed. The speed of rotation usually exceeds 100 R. P. M., the most efficient speed being dependent on the size of the churn as well as the condition and consistency of the cream. The casing 5 is gradually filled and as the cream passes upward it is churned in the successive chambers between disks 17 while the fat globules increase in size from chamber to chamber. It will be evident that the churning is accomplished by the rotary blades 18 and 19 which produce the desired concussion against the stationary baffles 20 in each of the compartments between disks 17.

When the top chamber has been reached a large proportion of the butter fat has been agglomerated and it finally overflows, with the buttermilk, through the conduit 12 upon the conveyor belt 26. This belt is operated continuously at a speed which is timed with that of the rate of supply to carry the product successively above the pans 29 and 31. In passing above the pan 29 the bulk of the buttermilk is drained off through the perforations in the conveyor belt 26. Continuing on the conveyor above the pan 31, the butter is washed by the spray 32 and is finally removed from the belt by the scraper 33, to be thereafter worked in conventional or suitable apparatus, not shown.

Due to the high speed and continuity of the operation the rate of production of butter by the use of our invention is high and much of the manual labor required for the batch operation of ordinary churns is eliminated. Our machine is preferably constructed from stainless steel adapted to withstand unusually high sterilizing temperatures and having the further advantage of not being subject to contamination by the growth of mold and yeast germs therein, as in ordinary wooden churns. After suitable periods of use the churn may be shut down and thoroughly sterilized either by passing hot water or steam through the casing 5, without removing the agitating units, or the latter, together with the baffle members 20 and axial shaft 13, may be removed from the top of the churn, after removing the cover plate 16, for more thorough washing and removal of solid deposits from all surfaces and crevices of the working mechanism and fixed interior walls. Control of the temperature of the cream during the churning operation is often desirable and this is facilitated by circulating water or other tempering medium through the jacket space 7 and connecting pipes 8 and 9.

The upward direction of flow of cream and progressive churning in the vertical series of chambers is an important feature of our invention which promotes efficiency due to the fact that the globules of butterfat, as they increase in size in the successive chambers, tend to rise to the top with increased velocity. The flow of these globules toward the overflow outlet is facilitated further by our increased spacing of the disks 17 from the churn walls near the top of the cylindrical churn casing.

Having described our invention, what we claim as new and desire to protect by Letters Patent is:

1. A continuous flow churn comprising a casing having walls of substantially circular shape in cross section, the axis of said casing being substantially vertically disposed, annular partition members dividing the casing into a vertical series of compartments having restricted passages between the outer peripheries of said members and said casing for the gradual upward flow of liquid and globules of fat from one compartment to another, the horizontal area of the passage between any two of said compartments being so restricted that it does not exceed a minor fraction of the area of a face of the partition member between said compartments, means for continuously supplying cream to the lower end of said casing, an outlet for butter and buttermilk communicating with the upper end of said casing, baffles projecting inward from said casing and substantially inward from the outer peripheries of the partition members toward the axis of the casing in the several compartments, an axially disposed shaft revoluble in the several compartments, means for rotating said shaft relative to the casing and baffles and a series of agitating units mounted on said shaft to coact with said baffles in churning the cream progressively as it flows upward to said outlet.

2. A churn as claimed in claim 1 wherein the capacity of the successive passages between the outer peripheries of said partition members and casing increases progressively upward.

3. A continuous flow churn comprising a substantially cylindrical casing disposed with its axis substantially vertical, means for continuously supplying cream to the lower end of the said casing, an outlet for butter and buttermilk communicating with the upper end of said casing, a power-driven axially disposed shaft mounted in said casing, fixed baffle plates projecting inward from the walls of said casing and extending substantially vertically therein and a multiplicity of agitating and partition units fixed on said shaft and dividing the casing into churning compartments, each of said units comprising a disk disposed horizontally with its periphery spaced from the casing and agitating blades extending at an angle to the several disks and projecting from the upper and lower faces of said disks to coact with said baffles in churning cream progressively during its flow upward to said outlet, the spacing of the successive disks from the walls of the casing being increased progressively upward.

4. A continuous flow churn comprising, a casing having walls of substantially circular shape in cross section, the axis of said casing being substantially vertically disposed, annular partition members dividing the casing into a vertical series of compartments having restricted passages between the outer peripheries of said members and said casing for the gradual upward flow of the contents from one compartment to the other, means for continuously supplying cream to the lower end of said casing, an outlet conduit communicating with the upper end of said casing, baffles projecting inward from said casing in the several compartments, an axially disposed shaft revoluble in the several compartments, means for rotating said shaft relative to the casing and baffles, and substantially radially extending blades fixed on the shaft and projecting adjacent to the respective opposed faces of the partition members defining the several compartments, the blades in each compartment being disposed angularly one to the other and each having a substantially radially extending edge spaced substantially midway between the partition members.

5. A continuous flow churn comprising a casing having walls of substantially circular shape in cross section disposed with its axis substantially vertical, normally stationary baffle plates projecting inward from the casing walls and extending longitudinally thereof, connections for feeding cream to the lower end of said casing, an outlet conduit communicating with the upper end of the casing for discharging butter and buttermilk therefrom, a power-driven shaft extending axially in said casing and a series of agitating and partition units fixed on said shaft in spaced relation to each other and dividing the casing into churning compartments, each of said units comprising a horizontally disposed disk having its outer periphery spaced from the walls of said casing to afford a restricted passageway between compartments, said baffle plates being formed with narrow horizontally extending openings in their inner edges to receive the peripheries of the several disks and blades projecting at an angle to said disks in the several compartments to coact with said baffles in churning the cream.

6. A continuous flow churn comprising a casing having walls of substantially circular shape in cross section disposed with its axis substantially vertical, normally stationary baffle plates projecting inward from the casing walls and extending longitudinally thereof, connections for feeding cream to the lower end of said casing, an outlet conduit communicating with the upper end of the casing for discharging butter and buttermilk therefrom, a power-driven shaft extending axially in said casing and a series of agitating and partition units fixed on said shaft in spaced relation to each other and dividing the casing into churning compartments, each of said units comprising a horizontally disposed disk having its outer periphery spaced from the walls of said casing to afford a restricted passageway between compartments and blades projecting at an angle to said disks in the several compartments to coact with said baffles in churning the cream, said baffle plates projecting inward above the upper face and below the lower face of the several disks and the outer ends of said blades being formed and disposed to pass parallel and closely adjacent to the inner edges of said baffle plates.

ALBERT C. HOUGLAND.
GLEN S. HOUGLAND.